United States Patent Office 3,428,189
Patented Feb. 18, 1969

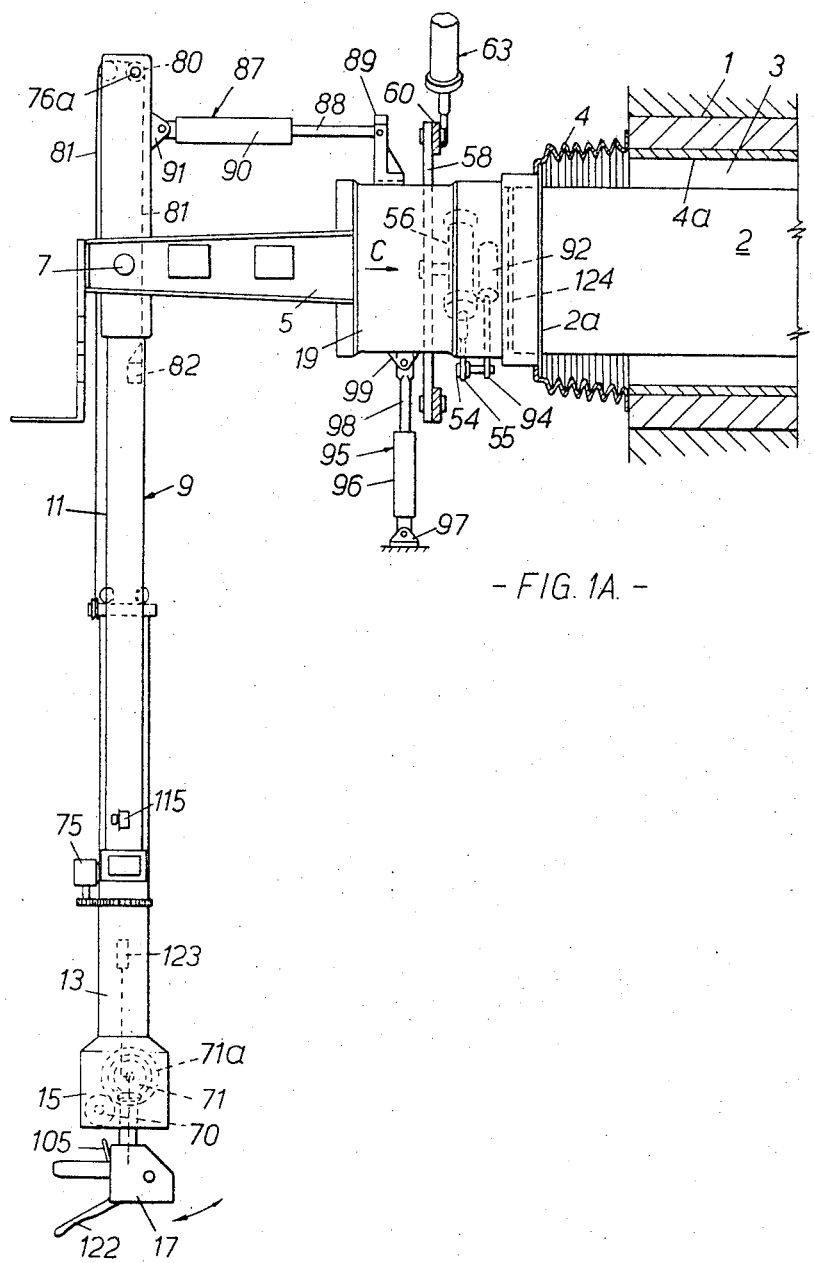
-FIG. 1A.-

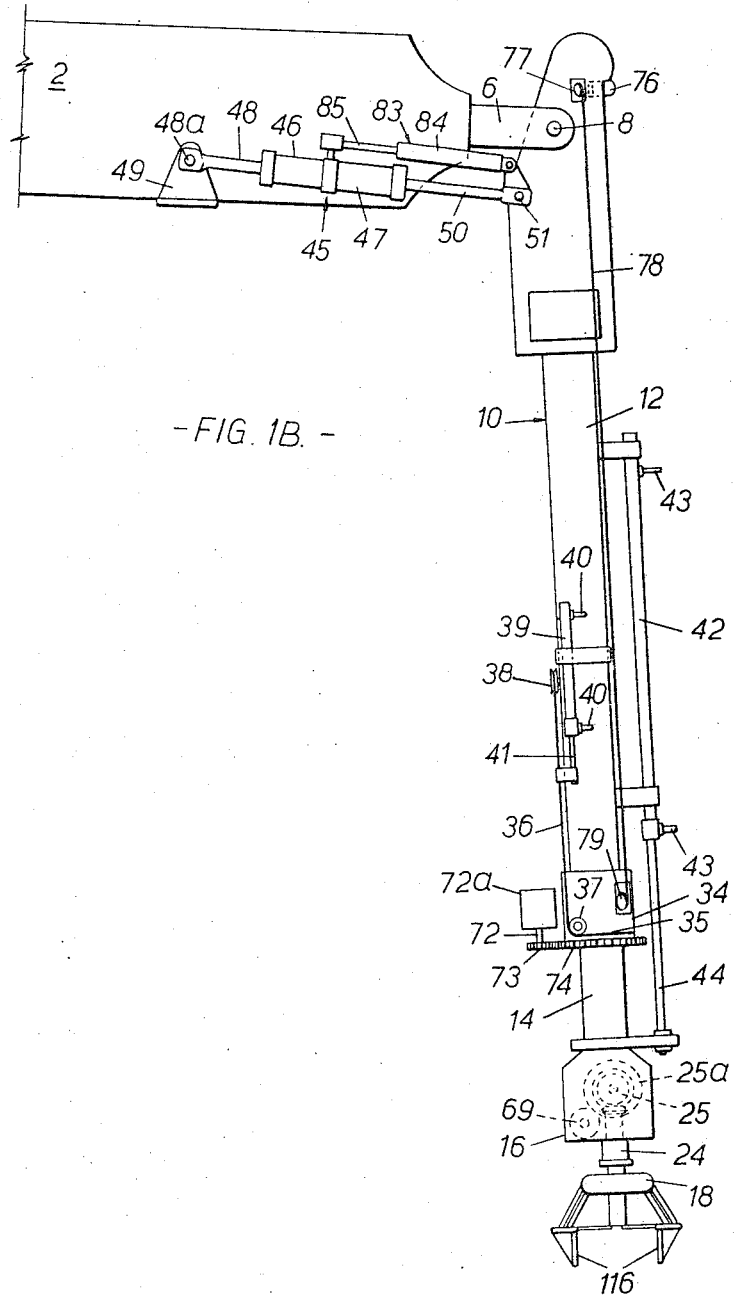
-FIG. 1B.-

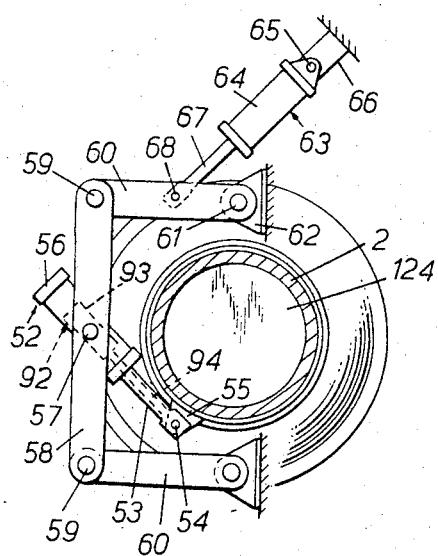
-FIG. 3.-
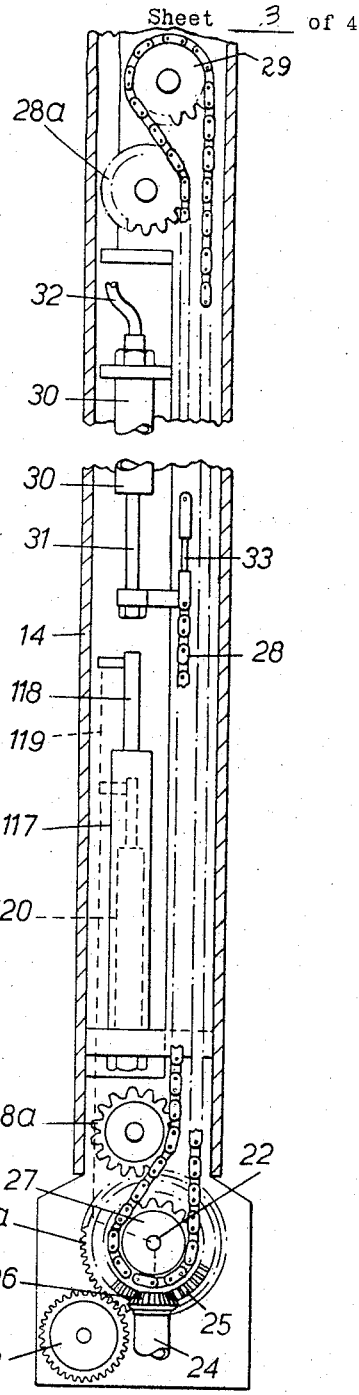
-FIG. 2.-

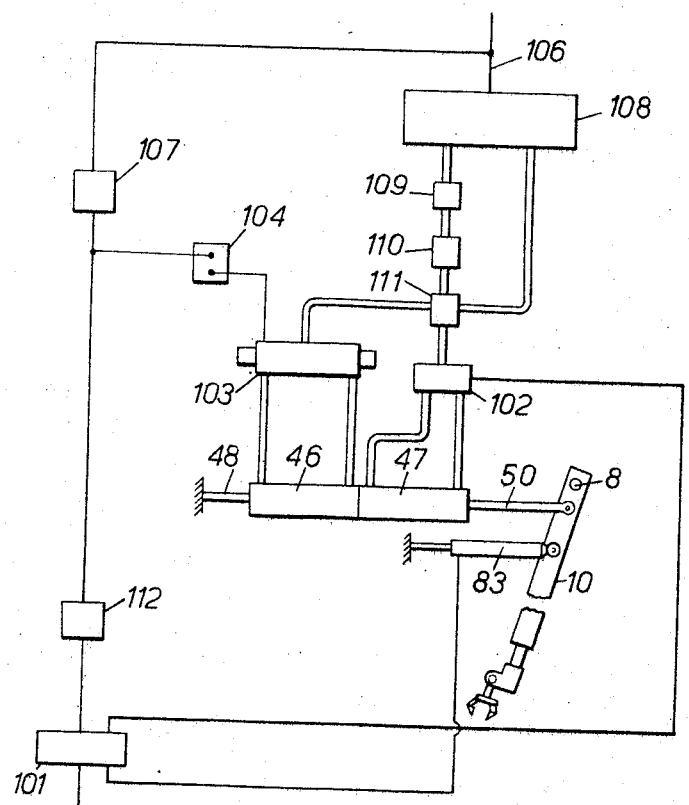
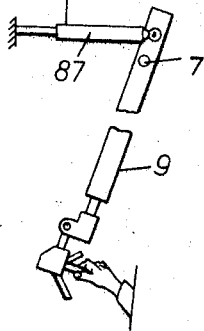
- FIG. 4.-

3,428,189
REMOTE-CONTROL MANIPULATOR
Alan Ainsworth, Thurso, Caithness, Scotland, assignor to United Kingdom Atomic Energy Authority, London, England
Filed June 10, 1966, Ser. No. 556,692
Claims priority, application Great Britain, June 22, 1965, 26,444/65
U.S. Cl. 214—1      9 Claims
Int. Cl. B25j 3/00

This invention relates to remote-control manipulators whereby objects, such as radioactive materials, can be manipulated in a shielded cabinet by an operator standing outside the cabinet and viewing the object through a window in the cabinet shielding.

On construction of remote-control manipulator which is widely used has spaced master and slave arms, a handgrip outside the shielded cabinet carried by the master arm, a work gripper within the shielded cabinet carried by the slave arm, and cables and tapes interconnecting the master and slave arms to cause movements of the master arm to be reproduced by similar movements of the slave arm. In one established manipulator a transverse hollow beam extends through the cabinet shielding with the master and slave arms pivoted at shoulder joints at each end of the beam. In this manipulator the master and slave arms are interconnected by flexible cables and tapes which pass through the hollow beam to cause movements of the master arm to be reproduced by the slave arm. Development of this manipulator has occurred in two respects; firstly it has been found that the load which can be carried by the gripper is severely limited by the flexible tapes and cables if reliable operation of the manipulator is to be maintained, and secondly it has been found necessary to be able to incorporate a manipulator into a shielded cabinet without reducing the gas-tight integrity of the cabinet. This second requirement is particularly important where active materials radiating alpha particles are to be handled, and also where the shielded cabinet is to contain an inert gas atmosphere of low impurity content. In the development of a strong manipulator it has been proposed that the master and slave arms should be interconnected by rotary connecting rods (U.K. patent specification No. 963,552). In the development of gas-tight manipulators it was first proposed that the slave arm should be enclosed in a transparent bag or gaiter of plastic film material. Subsequently a gas-tight bellows seal for flexible tapes in a manipulator has been proposed (U.K. patent specification No. 968,525). Electrically powered manipulators in which electric motors are carried by the slave arms have been regarded by their operators as unreliable, although they are interconnected by electrical leads which can be readily sealed in passage through the cabinet shielding.

The present invention provides, in one of its aspects, a remote-control manipulator having spaced master and slave arms wherein means to cause movements of the master arm to be reproduced by the slave arm comprise related pairs of transducers, the transducers of each pair being associated with the master and slave arms respectively so that electrical characteristics of a related pair of transducers are varied by related movements of the two arms, comparators to compare the electrical characteristics of related transducers, fluid pressure operated motors associated with the slave arm to effect the movements of the slave arm, fluid pressure control units linked with the motors and the comparators to energise the motors in a manner so as to balance the electrical characteristics of related transducers, and wherein at least one linkage to be actuated by fluid pressure is associated with the slave arm to effect displacement of the slave arm relative to, and without movement of, the master arm.

A manipulator embodying the invention might have master and slave arms linked solely by hydraulic lines leading to the motors associated with the slave arm and electrical leads between the transducers and the comparators, in which event the lines and leads would be sealed directly into the cabinet shielding. In an alternative embodiment of the invention the master and slave arms are pivotally connected to a transverse hollow beam at shoulder joints spaced axially of the beam and a bulkhead is sealed in a gas-tight manner into the beam, the bulkhead being traversed by stationary hydraulic lines and electrical leads which are sealed into the bulkhead in a gas-tight manner.

It is preferred that the transducers be variable resistors which are mechanically connected to the arms so that each range of movement of an arm is associated with the range of resistance of a variable resistor; these resistors are conventional rotary and linear types. The preferred motors are conventional hydraulic rams. The preferred comparators and control units are combined units in which a hydraulic spool valve is actuated by an electric torque motor having opposed torque coils; the torque coils are energised by potentials which are determined by two related transducers acting as potentiometers.

One construction of remote-control manipulator embodying the invention is desribed below, by way of example with reference to the accompanying drawings in which:

FIGURES 1A and 1B are part-diagrammatic views in elevation, FIGURE 1A showing the master arm and FIGURE 1B the slave arm, FIGURE 2 is an enlarged part-diagrammatic sectional elevation of the lower part of the slave arm of FIGURE 1B, FIGURE 3 is a diagrammatic view in the direction of arrow C of FIGURE 1A, and FIGURE 4 is a line diagram of an electrical and hydraulic circuit for one degree of movement of the manipulator.

The manipulator as shown in FIGURES 1A and 1B is supported in a cabinet wall 1 by a transverse hollow beam 2 which extends horizontally through a lined aperture 3 in the wall; a bellows seal 4 at the outer end of the beam (the end projecting outside the cabinet) between a sliding seal 2a on the beam and a liner 4a in the wall ensures that the beam is received into the wall in a gas-tight manner. Brackets 5, 6 at each end of the beam carry pivots 7, 8 to constitute shoulder joints by which master and slave arms 9, 10 are attached to the beam, the master arm being attached to the outer end and the slave arm to the inner end of the beam. The arms hang vertically when not in operation. Each arm comprises an upper arm 11, 12 attached to its shoulder joint and a lower arm 13, 14 which is rotatable and telescopically slidable with respect to the upper arm. A wrist unit 15, 16 carried at the lower end of each lower arm is, therefore, rotatable relative to the upper arm. A handgrip 17 projecting from the master wrist unit and a work gripper 18 projecting from the slave wrist unit are mounted for flexure with respect to the appropriate wrist unit by rotation about a wrist joint axis which lies transversely of the respective arm and for twist with respect to the wrist unit by rotation about an axis of twist perpendicular to the wrist joint axis. At its outer end the beam carries a master collar 9 to which the brackets 5 of the master shoulder joint are secured. The master collar 19 is rotatable about the beam and the beam itself is bearing mounted so as to be rotatable about its own axis within the lined aperture through the cabinet wall. This arrangement permits the master collar to be rotated about the beam by a lateral swinging movement of the master arm in a plane parallel to the cabinet wall.

The manipulator generally described above has six basic degrees of movement which are controlled by movement of the handgrip and are reproduced by movements of the slave arm to cause movement of the gripper of the slave wrist unit. The six degrees of movement are:

twist of the gripper and handgrip with respect to the wrist units,
flexure of the gripper and handgrip with respect to the wrist units,
rotation of the wrist units with respect to the upper arms,
fore and aft movement of the arms about their shoulder joints perpendicular to the cabinet wall,
lateral movement of the arms parallel to the cabinet wall, and
telescopic movement of the lower arms in the upper arms.

These six movements are caused in the master arm by manual movement of the handgrip by an operator. The six movements are caused in the slave arm by hydraulic motors in the form of rams in a manner now to be described.

The gripper 18 is carried by a joint in the slave wrist unit which, as stated, permits twist and flexure of the gripper with respect to the wrist unit. This joint (FIGURE 2) incorporates an axle 22 journalled in the unit to be transverse the axis of the slave arm. The axle, which provides the wrist joint axis, carries a yoke formed with a second axle 24 projecting perpendicular to the wrist joint axis; this second axle provides the axis of twist of the gripper. Two bevel gears 25 are freely (rotatably) mounted on the wrist joint axle 22 one on either side of the yoke; these wrist bevel gears mesh with a bevel gear 26 rigid with the gripper which is itself journalled on the second twist axle 24. This arrangement is such that flexure of the gripper with respect to the wrist unit is caused by rotation of the two wrist bevel gears in the same direction; conversely twist of the gripper with respect to the wrist unit is caused by rotation of the two wrist levels in opposed directions. The two wrist bevels 25 associated with the gripper are independently driven through the separate driver gears 25a, each gear 25a being rotatably mounted on the axle 22 and being connected to one of the bevels 25 and also to one of two-chain sprockets 27 freely (rotatably) mounted on the axle 22. Two endless chains 28 extend respectively around the two sprockets 27 and upwardly within the lower arm portion 14 to two idler sprockets 29 carried within the lower arm portion 14. The chains 28 have guide wheels 28a also mounted in the portion 14. Two double-acting hydraulic rams 30 (with pipe connections 32) also carried within the lower arm portion have ram rods 31 secured to the two chains respectively at tensioning devices 33 thereon so that energisation of the rams drives the chains and their associated wrist bevel gears. Accordingly energisation of the two rams in the same direction causes a twist of the gripper with respect to the wrist unit and energisation of the two rams in opposed direction causes a flexure of the gripper with respect to the wrist unit. (Only one of each of the components 25, 25a, 27 to 30 and 32 to 33 is seen in the drawings, the other being behind the one shown.)

At the lower end of the slave upper arm 12 is mounted a collar 34 which is rotatable with respect to the upper arm 12 about the axis of the arm. The lower arm 14 is keyed or splined into this collar 34 so that it can slide through the collar for telescopic movement into the upper arm but cannot rotate with respect to the collar. The slave wrist unit 18 is carried by the lower arm. The collar is formed with an integral pulley 35 with its axis concentric with the axis of the slave arm. An endless cable 36 extending around the pulley is guided upwardly outside the upper arm by two jockey wheels 37 to extend over an upper pulley 38 carried by the upper arm for rotation about an axis which is radial to the arm axis. A double-acting hydraulic ram cylinder 39 (with pipe connections 40) is mounted longitudinally on the outside of the upper arm and has a ram rod 41 secured to the cable 36; by means of this ram the cable can be driven to cause rotation of the wrist unit with respect to the upper arm. Alternatively a ball nut actuator or bevel gear drive may be used.

A double-acting hydraulic ram 42 (with pipe connections 43) is mounted longitudinally on the outside of the slave arm with its cylinder upper end secured to the upper arm 12 and with its ram rod 44 extending downwardly to be secured to the lower end of the lower arm 14. This longitudinal ram is employed to cause telescopic movement of the slave lower and upper arms.

Two double-acting hydraulic rams in a common casing 45 have separate cylinders 46, 47, a ram rod 48 associated with the cylinder 46 being pivotably connected at pivot 48a to a bracket 49 on the beam 2 near its inner end (that is to say the end projecting within the cabinet). A ram rod 50 associated with the cylinder 47 is pivoted to the slave upper arm at a pivot 51 spaced below the slave shoulder joint. The pivots 48a, 51 are selected so that when the slave arm is aligned with the beam the casing 45 lies beneath the beam axis. Fore and aft movement of the slave arm is caused by appropriate energisation of the two rams in the casing 45.

Lateral movement of the slave arm is caused by rotation of the beam about its own axis. Such rotation of the beam is effected by a first double-acting hydraulic ram 52 (FIGURE 3) which has a ram rod 53 pivoted at pivot 54 to a lug 55 carried by the beam near its outer end. The body 56 of this first ram is pivoted at pivot 57 to an intermediate member 58 of a linkage, the member 58 being pivotably connected at pivots 59 to two parallel links 60 pivotably connected at their other ends by pivots 61 to wall brackets 62. A second double-acting hydraulic ram 63 has its body 64 pivoted at pivot 65 to a wall bracket 66 and a ram rod 67 pivoted to the linkage at pivot 68 on upper link 60.

The six movements of the master and slave arms are signalled by six pairs of related transducers which take the form of variable resistors. These variable resistors are mounted in the following manner. Two rotary resistors 69 (one of which is shown) are mounted in the slave wrist unit, each resistor being geared to one wrist bevel driver 25a. The resistors 69, typically having a range of up to 1000 ohms, through which they are driven by the operational range of rotation of their associated wrist bevel gears, are employed to indicate twist and flexure of the gripper. Two related rotary resistors 70 (one of which is shown) are mounted on the master wrist unit which also incorporates wrist bevel gears 71 and driver gears 71a in an arrangement similar to that found in the slave wrist unit; these resistors 70 are employed to indicate twist and flexure of the handgrip.

For an indication of rotation of the slave wrist unit with respect to the slave upper arm, a rotor 72 of a rotary resistor 72a carried by the upper arm 12 is geared through gears 73, 74 to the jockey wheels 37 which guide the cable 36 from the pulley 35. Similarly a related rotary resistor 75 is carried at the lower end of the master arm; this resistor consequently renders an indication of rotation of the master wrist unit with respect to the master upper arm.

Telescopic movements of the lower and upper arms are indicated by related rotary resistors 76, 76a carried at the upper ends of the master and slave arms. In the case of the slave arm the resistor 76 is geared to a pulley 77 carried by the upper arm over which is passed an endless tape or chain 78 which runs down outside the upper arm, over a pulley 79 near the lower end of the upper arm and up within the upper arm to the resistor pulley. Within the upper arm the endless tape is secured to the upper end of the lower arm so that telescopic movement of the upper and lower arms causes the tape to pass over the pulleys. A spring is incorporated into the endleses tape to provide tension in the tape. In the case of the master arm the resistor 76a is geared to a pulley 80 carried by the upper arm over which is passed a tape 81 which is connected at one end to the master lower arm and at the other end to a weight 82 to counterbalance the lower arm. Telescopic movement of the master lower and upper arms causes the tape to pass over the resistor pulley.

Fore and aft movements of the master and slave arms are indicated by related linear resistors 83, 87 each having a body and a slider rod. In the case of the slave arm resistor 83 the resistor body 84 is pivoted to the pivot 51 and the resistor slider rod 85 is pivoted to the cylinder 47. The master arm linear resistor 87 has its slider rod 88 pivoted to a bracket 89 on the master collar carried by the outer end of the beam and its body 90 pivoted to a bracket 91 on the master upper arm spaced upwardly from the master shoulder joint, the resistor 84 extending in a direction lengthwise of the beam.

Lateral movements of the master and slave arms are indicated by related linear resistors. One of these resistors 92 has its body 93 pivoted to the linkage member 58 at pivot 57 and its slider rod 94 pivoted to the lug 55 on the beam at pivot 54, whilst the other of these resistors 95 has its body 96 pivoted to a wall bracket 97 and its slider rod 98 pivoted to a bracket 99 secured to the master collar, the resistor 95 extending in a direction transversely of the beam.

Comparators, to compare the electrical resistances of related transducers, and control units in the form of hydraulic control valves, to energise the motors or rams in a manner to balance the resistances of the related resistors, are combined in a series of known servo valves. Each servo valve comprises a spool valve which is actuated by an electric torque motor having opposed torque coils. The displacement of the valve spool is dependent upon the inequality between the torques applied by the torque coils, the spools being in a position to close the valve when the torques are equally balanced. One example of such a servo valve is disclosed in U.K. patent specification No. 923,839.

For each of the six degrees of movement of the master and slave arms there is a servo valve and a related pair of transducers. The servo valves are housed in a casing outside the shielded cabinet and to this casing are led hydraulic lines from the rams and electrical leads from the transducers. An electrical source is connected across the full length of each transducer resistor and a variable potential is taken from the tapping of each resistor, the transducers thus acting as potentiometers. The variable potentials from each related pair of transducers are delivered through electrical leads to an amplifier and thence to the torque coils of a servo valve. Each servo valve is connected in a hydraulic circuit between a source of hydraulic power and the respective hydraulic ram associated with the slave arm movement controlled by the servo valve.

In operation of the manipulator, movements of the master arm are indicated by variations of the electrical potential applied to the servo valves of the appropriate transducers carried by the master arm. The servo valves, which are thus subject to unbalanced torques, operate to drive the rams carried by the slave arm to cause the movements of the master arm to be reproduced by the slave arm. The slave arm movements are indicated by variations in the potentials applied to the servo valves by the slave arm transducers. The slave arm movements are terminated by the servo valves when the potentials applied to each valve are balanced. Thus the servo valves energise the rams in a manner so as to balance the resistances of related transducers carried by the master and slave arms.

Thus considering fore and aft movement for example in the context of the circuit of FIGURE 4, manual movement of the master arm 9 is indicated by variation of the electrical potential applied from the transducer 87 through electrical connections to an amplifier 101 and thence through electrical connections to a related servo valve 102 of the type described above. The servo valve 102 operates to drive the ram rod 50 to cause movement of the master arm 9 to be reproduced by the slave arm 10. The slave arm movement is indicated by variation in the electrical potential applied from the transducer 83 through electrical connections to the amplifier 101 and thence through electrical connections to the servo valve 102. The slave arm movement is terminated by the servo valve 102 when the potentials applied to it are balanced. Thus the servo valve 102 energises the hydraulic ram (comprising the cylinder 47 and ram rod 50) in a manner so as to balance the resistances of the related pair of transducers 87, 83 carried respectively by the master and slave arms 9, 10.

The manipulator has the facility of providing for displacement between the master and slave arms with respect to at least one of the degrees of movement. Thus fore and aft displacement is a term applied to angular displacement of the slave arm about its shoulder joint with respect to the master arm. To effect such displacement the linkage in the form of the hydraulic ram comprising cylinder 46 and ram rod 48 is energised by way of a double-solenoid, spring-centered hydraulic valve 103 actuated by a selection switch 104 (itself actuated by a switch 105—FIGURE 1A—on the handgrip 17) to displace the cylinder 46 relative to the rod 48 and thus displace the slave arm 10 angularly about its shoulder joint 8 with respect to the master arm 9, the relative positions of the resistor body 84 and rod 85 remaining unchanged.

The circuit of FIGURE 4 includes a main electrical supply 106, a D.C. source 107 effectively connected across the full length of each of the resistors of the transducers 83, 87, a hydraulic power pack 108 with pipe connections to a filter 109, an accumulator 110 and a pressure control valve 111. The valve 111 has pipe connections to the valves 102, 103, whilst the valve 102 has pipe connections to each end of the cylinder 47 and the valve 103 has pipe connections to each end of the cylinder 46. Also shown in the circuit is a signal oscillation control unit 112.

Whilst the circuit for fore and aft movement has been shown by way of example, it is to be clearly understood that similar provision is made for the other degrees of movement. Thus in the case of lateral movement, a servo valve of the kind described above is included in the circuit in association with the related pair of transducers 92, 95 and this servo valve operates in response to the signal from the transducer 95 representing manual movement of the master arm 9 to drive the ram 52 (without movement of the linkage 58, 60) to cause movement of the master arm to be reproduced by the slave arm. The slave arm movement is indicated by the signal from the transducer 92 and is terminated by the servo valve when the signals are balanced. There is also provision for lateral displacement, which is a term applied to angular displacement of the slave arm with respect to the master arm about the axis of the beam. Such lateral displacement is of particular importance where it is desired to handle materials in a cabinet which are set to one side of a window into the cabinet provided for the operator; in this event it is convenient for the operator to position the master arm close to the window whilst the slave arm is displaced laterally to be close to the material to be handled. To effect lateral displacement of the slave arm, the above-described second double-acting hydraulic ram 63 is energised, by way of a double-solenoid spring-centered, hydraulic valve included in the hydraulic circuit and actuated by a selection switch operated by a switch on the master arm, to move the linkage 58, 60 and thus rotate the beam and slave arm about the beam axis without movement of the master arm. The fluid-pressure actuated linkage arrangement gives a smooth displacement action and provides that the related pair of transducers retain the same tangential position with respect to the beam axis, even though they are relatively displaced, say by 90°. This makes for equal sensitivity over the range of movements then reproduced by the slave arm (in its displaced position) from movements of the master arm.

For the purpose of telescopic displacement an adjustable resistor 115 is connected as a potentiometer in series with the transducer 76a on the master arm associated with telescopic movement of the master arm. By means of this adjustable resistor, it is possible to unbalance the potentials applied to the servo valve controlling telescopic movement without moving the master arm. In this manner telescopic displacement of the slave arm with respect to the master arm is effected.

The gripper carried by the slave arm has two jaws 116 whose gripping movement is also controlled by a servo valve of the kind described above. The jaws are powered by a hydraulic ram 117 mounted in the lower slave arm and having its rod 118 linked with the jaws by means of a flexible cable or chain 119. The jaws are spring-loaded to their open state. A linear variable resistor 120 mounted within the slave lower arm has its slider 121 linked to the chain so as to act as a transducer to indicate the position of the jaws. Similarly the handgrip carried by the master arm has two fingers 122 which are closed together by the operator to cause the slave jaws to close. These fingers are linked by a flexible cable to a coil spring mounted within the master lower arm. A linear variable resistor 123 within the master lower arm acts as a transducer to indicate the position of the two fingers. The indications are applied to a servo valve which powers the gripper ram to cause the gripper jaws to follow movements of the handgrip fingers in a manner similar to that described with relation to the other manipulator movements. A variable valve in the hydraulic circuit between the gripper ram 117 and the source of hydraulic power is adjustable between three settings and thus controls the power applied to the gripper ram to be within a range appropriate for handling of light equipment such as glassware by the gripper, a standard range, and a range appropriate for heavy duty work by the gripper.

It is a feature of the manipulator described above that the hollow transverse beam is penetrated solely by hydraulic lines leading to the rams carried by the slave arms and electrical lines leading to the electrical transducers carried by the slave arm. Accordingly, a metal bulkhead 124 is sealed into the beam to provide a gastight seal between the two ends of the hollow beam. This bulkhead is penetrated by fixed electrical contact and by hydraulic connectors, these contacts and connectors being sealed into the bulkhead in a gas-tight manner. The electrical leads and hydraulic lines linking the master and slave arms (such as the electrical connections and the pipe lines shown in the circuit of FIGURE 4) are broken at the bulkhead and connection is made between them through the contacts and connectors. As a consequence the penetration of the cabinet wall by the beam does not impair the gas-tight integrity of the cabinet.

The load which can be carried by the gripper of the manipulator described above by way of example is considerably increased as compared with a manipulator using flexible cables and tapes. The slave arm can be fitted with a fully enclosed bellows type seal (e.g. stainless steel or heavy duty plastic bellows) effectively sealing it against alpha particle penetration.

I claim:
1. A remote-control manipulator having spaced master and slave arms, wherein means to cause movements of the master arm to be reproduced by the slave arm comprise related pairs of transducers, the transducers of each pair being associated with the master and slave arms respectively so that electrical characteristics of a related pair of transducers are varied by related movements of the two arms, comparators to compare the electrical characteristics of related transducers, fluid pressure operated motors operatively associated with the slave arm to effect the movements of the slave arm, fluid pressure control units linked with the motors and the comparators to energise the motors in a manner so as to balance the electrical characteristics of related transducers, and including at least one linkage to be actuated by fluid pressure operatively associated with the slave arm to effect displacement of the slave arm relative to, and without movement of, the master arm.

2. A remote-control manipulator as claimed in claim 1, wherein the transducers are in the form of variable resistors which are mechanically connected to the arms so that each range of movement of an arm is associated with the range of resistance of a variable resistor.

3. A remote-control manipulator as claimed in claim 2, wherein the motors are in the form of hydraulic rams.

4. A remote-control manipulator as claimed in claim 3, wherein the comparators and control units are of combined form.

5. A remote-control manipulator as claimed in claim 4, wherein the master and slave arms are pivotally connected to a transverse beam at shoulder joints spaced axially of the beam.

6. A remote-control manipulator as claimed in claim 5, wherein the linkage is pivotally connected to the beam.

7. A remote-control manipulator as claimed in claim 6, wherein the linkage comprises a linkage hydraulic ram.

8. A remote-control manipulator as claimed in claim 7, wherein the linkage further comprises in the case of lateral displacement a linkage member pivotally connected to the linkage hydraulic ram and also to the motor which is provided to effect lateral movement of the slave arm in response to lateral movement of the master arm.

9. A remote-control manipulator as claimed in claim 8, wherein the beam is hollow and hydraulic lines leading to the hydraulic rams associated with the slave arms and electrical leads between the transducers and comparators traverse in sealed fashion a bulkhead in the beam.

References Cited

UNITED STATES PATENTS 3,297,712   1/1967   Haaker.
3,314,552   4/1967   Vertut.

GERALD M. FORLENZA, *Primary Examiner.*

GEORGE F. ABRAHAM, *Assistant Examiner.*